(12) United States Patent
Bishel

(10) Patent No.: US 6,356,038 B2
(45) Date of Patent: *Mar. 12, 2002

(54) MICROCOMPUTER-CONTROLLED AC POWER SWITCH CONTROLLER AND DC POWER SUPPLY METHOD AND APPARATUS

(76) Inventor: Richard A. Bishel, 16020 NW. Ridgetop La., Beaverton, OR (US) 97006

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/489,876

(22) Filed: Jan. 20, 2000

Related U.S. Application Data

(63) Continuation-in-part of application No. 09/251,233, filed on Feb. 16, 1999, which is a continuation of application No. 08/358,338, filed on Dec. 14, 1994, now Pat. No. 5,872,832.

(51) Int. Cl.[7] .................................................. G05F 1/00
(52) U.S. Cl. ...................... 315/291; 315/307; 315/287; 323/905
(58) Field of Search ................................. 323/319, 320, 323/351, 324, 283, 905; 315/291, 307, 287

(56) References Cited

U.S. PATENT DOCUMENTS

| 4,300,090 A | 11/1981 | Weber | |
|---|---|---|---|
| 4,649,323 A | 3/1987 | Pearlman | |
| 4,733,138 A | 3/1988 | Pearlman | |
| 4,754,213 A | 6/1988 | Dubot | |
| 4,878,010 A | 10/1989 | Weber | |
| 4,924,109 A | 5/1990 | Weber | |
| 5,025,134 A | * 6/1991 | Bensoussan et al. | 323/319 |
| 5,319,283 A | 6/1994 | Elwell | |
| 5,481,452 A | 1/1996 | Simmons | |
| 5,753,983 A | 5/1998 | Dickie | |
| 5,811,963 A | 9/1998 | Elwell | |
| 5,955,847 A | * 9/1999 | Rothenbuhler | 315/289 |

* cited by examiner

*Primary Examiner*—Shawn Riley
(74) *Attorney, Agent, or Firm*—Richard Bishel

(57) ABSTRACT

An AC controller which provides programmable switching of AC power flow, together with producing a source of DC power for operating the AC controller. The AC controller is connected in series with only one side of the AC power source and the AC load. The AC controller utilizes a thyristor for AC power control switching. During the operation, the AC controller steals a small portion of each half-cycle of the AC power to provide DC power to the AC controller. The AC controller enables the flow of AC current by providing a gate current pulse at any predetermined time during the half cycle. Once the thyristor is ON, the AC current flows through the thyristor until the AC cycle is at or near zero. To provide an OFF state, the AC controller does not provide a gate current pulse. The AC controller uses an microcontroller for the programmable capability. The AC controller can be programmed to provide a flashing light function, a time delay off mode, an automatic fade mode, a dimming function, a burglar deterrent function, and a time delay dim function. With a three-position switch which can replace existing types of wall switches, three modes of operation are achieved: ON, OFF, and MODE. The mode position initiates operation of the special function of the controller.

10 Claims, 19 Drawing Sheets

MICROCOMPUTER-CONTROLLED AC POWER SWITCH CONTROLLER AND DC POWER SUPPLY METHOD AND APPARATUS

RELATED APPLICATIONS

This is a Continuation-In-Part Application of application Ser. No. 09/251,233 filed Feb. 16, 1999 which is a continuation of U.S. patent application Ser. No. 08/358,338 filed Dec. 14, 1994, now issued as U.S. Pat. No. 5,872,832.

FIELD OF THE INVENTION

This invention relates to AC electric current control systems, such as motor controllers and illumination switches.

BACKGROUND OF THE INVENTION

The connection of AC power controllers with the wiring of buildings is usually obtainable only with one side of the AC power line. For example, the wire for the switch circuit from a ceiling or porch light is often connected with the hot side of the AC circuit being the only line switched. Therefore, full line power is not available at most wall switch locations. As a result of this wiring practice, it is necessary that any electrical device intended to find popular acceptance as a replacement for a wall-mounted switch must rely upon merely the power present in the one side of the circuit. Such a device must be connected in series with the load and the AC power source.

Also, wall-mounted switch controllers which include dimmers, time-delay devices, emergency flashing devices, variable intensity controllers, and motor controllers are designed as dedicated devices that serve one function and usually are designed where the full line power is available. If not available, then additional wiring is needed.

Weber in U.S. Pat. No. 4,300,090 and Dubot et al in U.S. Pat. No. 4,754,213 disclose a technique to provide DC power supply by taking the pre-conduction potential which is developed across a thyristor. This potential is derived by fixing the turn-on voltage by zener diodes. The AC power is rectified and filtered to provide low voltage direct current. This requires a thyristor to provide the voltage drop and another thyristor or relay to control the load device current.

Weber noted this deficiency in U.S. Pat. No. 4,878,010 where he uses a slightly different technique in which the thyristor is used for both deriving low voltage DC power and also as the control device. In this patent, Weber derives the power from the zener drop during ON and OFF times to provide the low-voltage DC power. He controls the thyristor by allowing the zener current to the thyristor or diverts the current flow away from the gate of the thyristor to other side of the circuit using a shunting scheme. The turn-on potential of the gate along with the zener voltage sets the low voltage DC power when the thyristor is ON and shunting transistor with the zener voltage sets the low voltage DC power when the thyristor is OFF. Depending on the thyristor gate voltage, the low voltage DC will be at different levels for the control circuits. Also, Weber discloses in U.S. Pat. No. 4,878,010 a technique to provide AC power control using one side of the AC lines. His technique is limited to charging a capacitor every other half cycle, on only the positive-going AC cycles. Therefore, to maintain the necessary power for the complete cycle, Weber needs to use a much larger capacitor for the storage of the DC power then if one uses every half cycles of AC power. Furthermore, he needs to use thyristors that have sensitive gate control, which are more expensive than typical thyristors. In addition, Weber shows several dedicated configurations for each type of functions, which requires extensive hardware redesign for each function.

Other references shown have circuits which use a microcontroller, but derive their power from charging a large capacitor, batteries, transformers, or are designed to have both AC lines available. Here is the summary of the different schemes which have been proposed to provide power to the control circuitry:

In U.S. Pat. No. 4,878,010, the device turns ON at a fixed voltage level and provides power during the time the load is powered. However, the device must use a very large capacitor because the device derives power every cycle, and uses a dedicated circuitry. Also, the fixed voltage level limits the usefulness of the device to ON and OFF operations.

In U.S. Pat. No. 4,754,213, the device uses a thyristor and a large power relay in series. It fixes the ON voltage to a certain level, and uses a dedicated circuitry.

In U.S. Pat. No. 4,924,109, the device use the same technique as U.S. Pat. No. 4,878,010 and allows for a 30–50% DIM operation.

In U.S. Pat. No. 5,481,452, the device has a programmable controller, but derives power from a transformer which is connected to both leads of the AC source, or from a battery when one lead is only available.

In U.S. Pat. No. 5,573,983, the device has a programmable controller, but has a dedicated power supply derived from both AC lines.

In U.S. Pat. No. 4,733,138, the device requires two AC power lines for power.

In U.S. Pat. No. 4,733,138, the device requires a two AC power lines which are coupled by a transformer to derive the DC power supply.

In U.S. Pat. No. 4,649,323, the device has a microcontroller and a zero-crossing detector, but uses dedicated DC power supply which is derived from both AC power lines. It requires a choke to operate, and only the switches are wall-mounted.

In U.S. Pat. No. 5,319,283, the device requires a large capacitor to keep power when the device provides power to the AC load. It also requires two thyristors for controlling the switching operation.

In U.S. Pat. No. 5,811,963, the device charges the large capacitor during the time when the AC load is not being provided power. During the time when the AC load requires power, the device uses the DC power from the stored power in the capacitor. If the power is required continuously, this scheme is not effective.

The disadvantages of the prior art are as follows:

a. more and higher cost components;

b. limited flexibility for features and functions;

c. not a single wire line device, and therefore can not be use in older dwellings.

Accordingly, there has heretofore existed a need for an inexpensive and effective system for providing an AC power controller who derives its power from series connection between the AC power source and AC load.

SUMMARY OF INVENTION

The present invention provides a highly versatile microcomputer-controlled switch operating in series with an AC circuit that is installed between an AC load such as a light fixture, and the source for the AC power. This versatile switch controller derives DC power form the AC circuit, which is in series with the AC load and AC power, by stealing a small portion of the AC power every half cycle. This AC power is rectified for each half cycle and is used to maintain a small capacitor charge during the times when controller has turned ON power to the load.

In previous inventions, the capacitor needs to be large enough to maintain DC power for a full cycle or more such as noted in Weber U.S. Pat. No. 4,878,010 or required two thyristors such as U.S. Pat. No. 4,745,213. In both these cases, '010 and '213, the AC voltage used was fixed based on the external connected zeners. The problem with these arrangements is that fixing the voltage where the thyristor turns ON limits the device to ON and OFF operations and does not lend itself to dimming functionality. In this invention, by contrast, the amount of AC voltage can vary or be fixed depending on the microcontroller or circuitry. If one needs to dim the lights or slow down the motor, than the AC voltage would be switch ON at any portion of the AC cycle.

Since this design utilizes an isolation thyristor driver such as a relay or optoisolator driver, the microcontroller can easily be programmed to turn the power to the AC load ON and OFF, similar to if one were to use a controller with a dedicated power supply. The controller only needs to provide gate current pulse at the beginning of every halfcycle to enable the thyristor. Once the thyristor is provided with a gate current, it turns ON. The thyristor stays ON even without any further current in the gate until the AC voltage goes back to zero.

The primary object of the invention is the technique to provide power to the controller by stealing a portion of the AC power at the beginning of the half cycle and to provide the gate current pulse to enable the thyristor. During any portion of the half cycle, the controller can initiate an ON cycle by providing a gate current pulse. Once initiated, the thyristor takes over until the end of the half cycle zero crossing. The controller can maintain an OFF condition by not providing the gate current pulse.

A further object of this invention is to provide a light level controller, which includes an automated fade function, which gradually fades the light intensity level from a full ON to an OFF condition.

Another object of this invention is to provide a light controller which the light is turned ON and OFF at long random times from minutes to hours. This simulates that the house is lived in and deters burglars.

Another object of this invention is to provide a light controller, which has an attention-getting mode that flashes the light from full brightness to dim at a fast, periodic rate. This light controller if installed in the front porch light electrical circuit would help delivery personnel locate the house.

Another object of this invention is a light controller, which dims the light level for a period of minutes and then turns the light OFF. This light controller would be used in a child's bedroom to allow for a quiet time before the light goes off completely.

Another object of this invention is a three-position switch where one position selects the power controller, which allows for different modes. The other two positions would be full ON and full OFF.

DESCRIPTION OF INVENTION a. Overview

Figure 1:
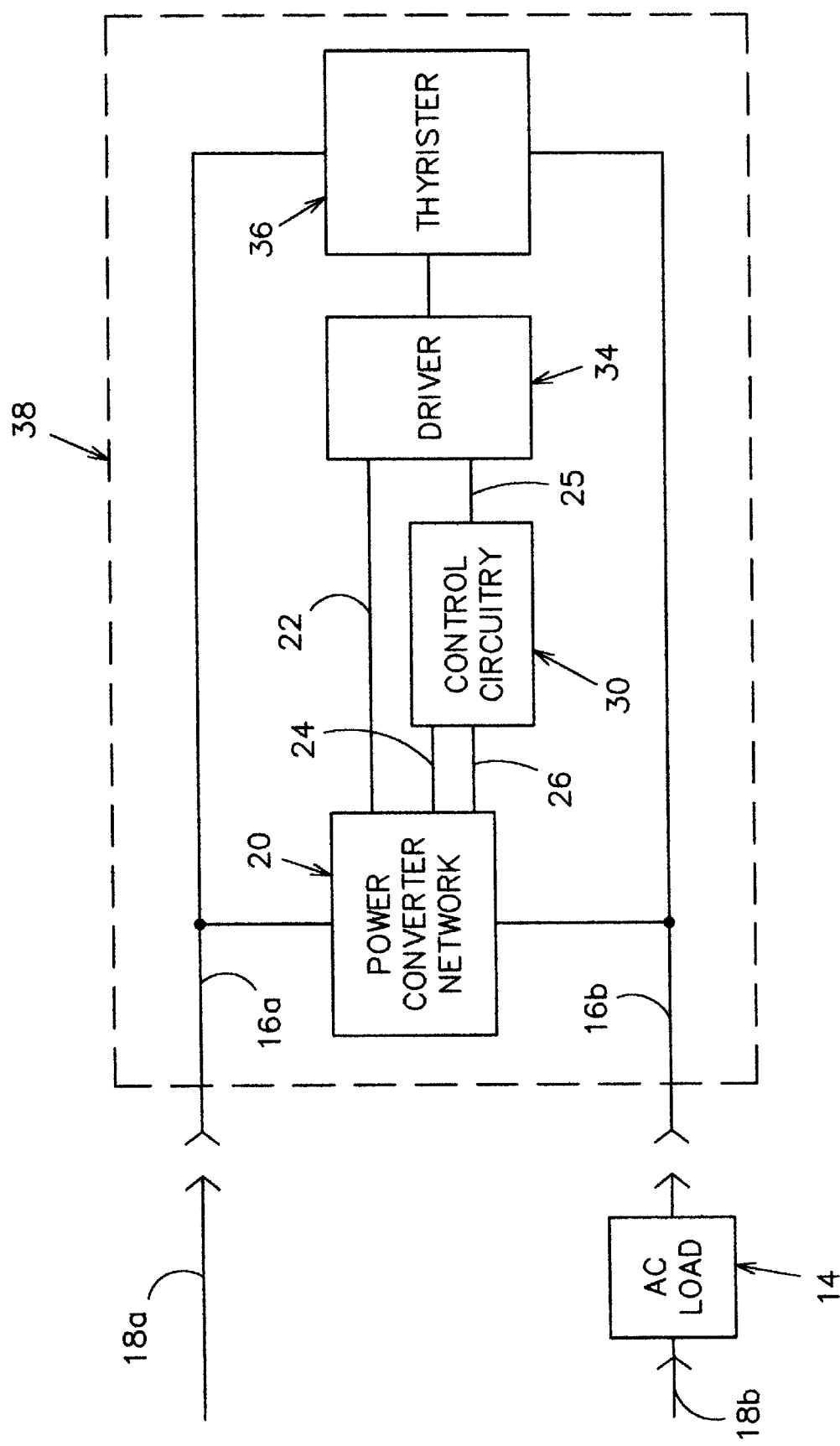
FIG. 1 is a block diagram showing an of the AC power control circuit in accordance with the present invention.

FIG. 1 shows a block diagram schematic of the AC power control circuit 38 in which AC power from AC source 18a and 18b is applied to load 14 under control of series power control circuit 38. The AC power control circuit 38 includes a thyristor 36, the power network 20, a thyristor driver 34, and the control circuit 30. The power network 20 provides low voltage through lines 24 and 26 continuously to operate the control circuit 30 and the necessary drive current pulse when needed by the thyristor driver 34 via lines 22 and 25. The thyristor driver 34 provides the necessary gate current pulse to turn the thyristor 36 ON.

A thyristor 36 is a semiconductor power switch that allows high current AC or DC to flow when trigger by a gate current pulse. Two types of thyristors are SCRs (Silicon-Controlled Rectifiers), and TRIACs (TRIode AC switches).

The operation, principle components, and exemplary applications for the invention are described in greater detail under the appropriate subheadings below.

b. Cycle-Stealing

Figure 2:
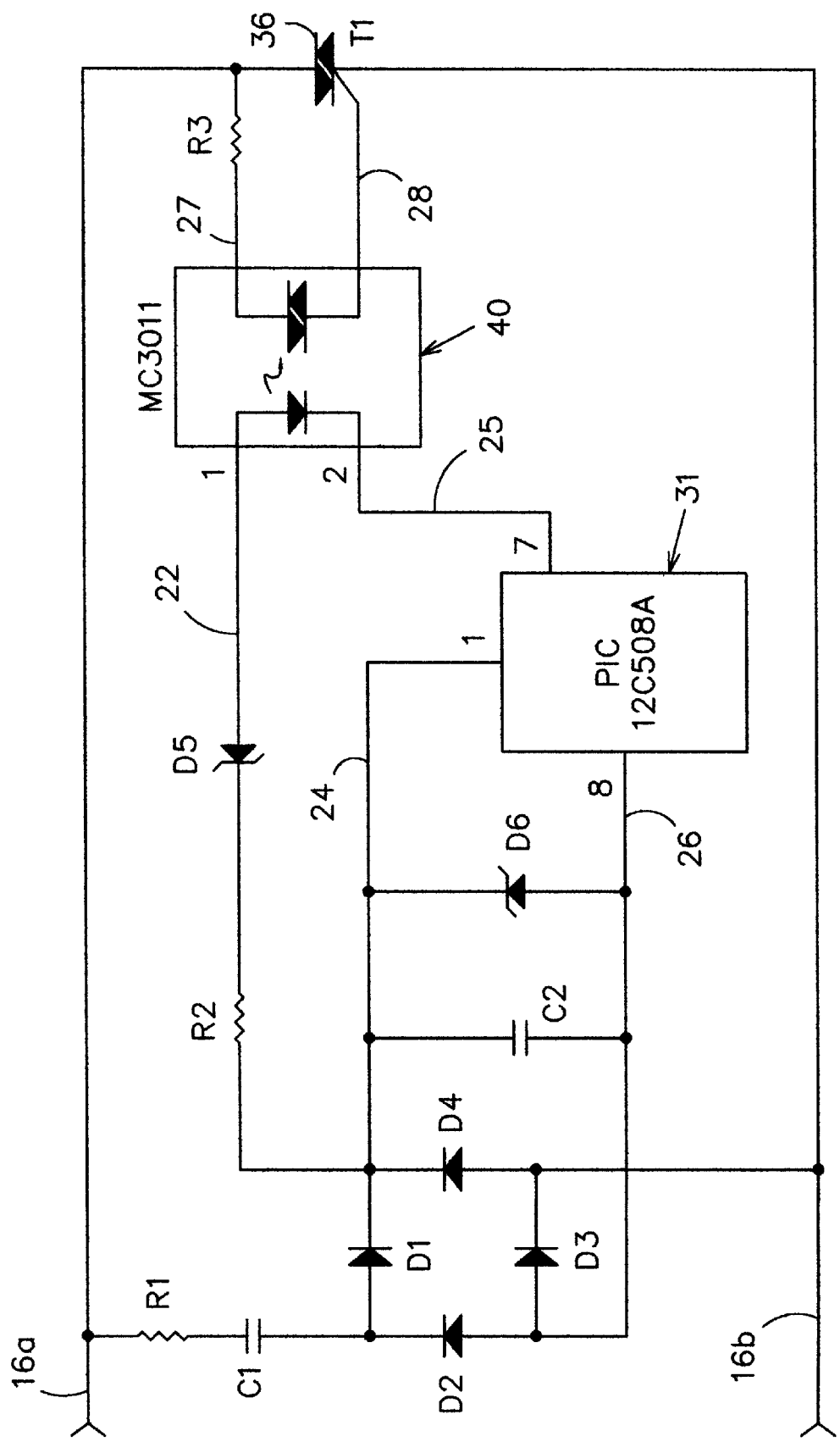
FIG. 2 is an schematic diagram showing the AC power control circuit of FIG. 1.

FIG. 2 shows an electrical schematic of one version of the AC power control circuit 38 illustrated in FIG. 1. Here, the control circuit uses a microcontroller 31. Each block of FIG. 1 is represented by electronic components. In this circuitry, the power network 20 provides the continuous power to the microcontroller 31 shown as a Microchip PIC 12C508A. The circuit includes R1 and C1, which minimizes the current and voltage to acceptable level. Diodes D1, D2, D3, and D4 converts AC power to DC power. Diode D6 is a zener diode, which keeps the voltage level on lines 24 and 26 to an acceptable level for the microcontroller 31. Capacitor C2 maintains the current to the microcontroller 31 during the times when the AC power is not provided. The thyristor driver circuitry includes resistor R2, diode D5, an optoisolator triac driver 40 shown as a Motorola MC3011, and resistor R3. To enable the triac driver, the microcontroller 31 allows a minimum current pulse to flow through line 25. The output lines 27 and 28 of the triac driver 40 closes the path from resistor R3 to the gate of the thyristor 36. This provides a gate current pulse to the thyristor 36, which causes the thyristor to conduct and be in an ON state. Once the thyristor 36 is ON, there will be no more current flowing to the control circuitry via lines 16a, R1, and C1. The thyristor 36 stays ON until the AC voltage across terminals 16a and 16b goes to zero, which happens every half cycle.

The minimum current pulse to trigger the thyristor driver which triggers the thyristor is provided by the power network circuitry via R1, C1, the diodes D1–D4, resistor R2, and diode D5 through the output line 25 of the microcontroller 31. Resistor R1, capacitor C1 and resistor R2 limit the current to the thyristor driver 40. D5 provides a minimum level of voltage to line 24 so that the microcontroller 31 has sufficient DC power during the time when it output drives the thyristor driver 40 continuously ON. Diode D5 can be eliminated in configurations where the microcontroller monitors the zero crossings and provides the necessary gate current pulse for the minimum duration needed to trigger the thyristor or when R2 is high enough value that the current draw from C2 is minimal.

Figure 3A:
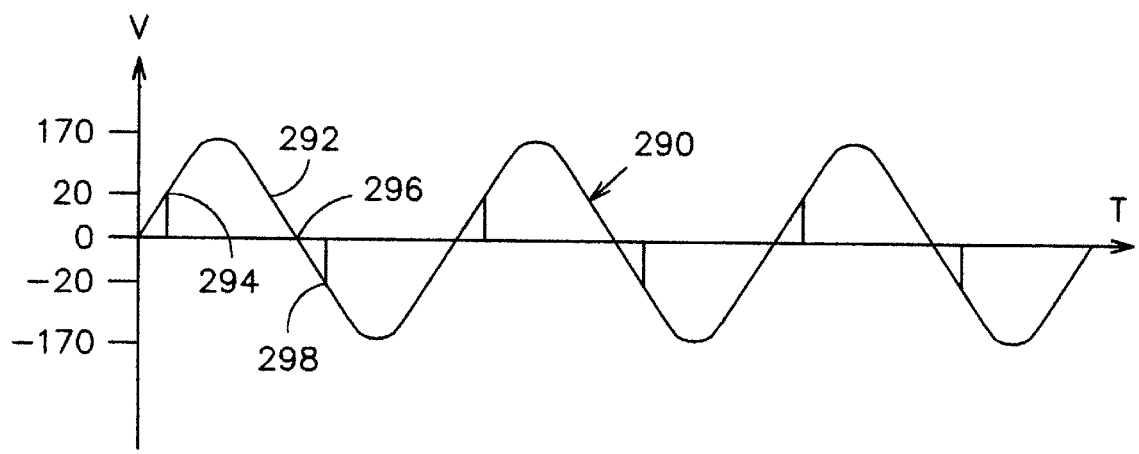
FIG. 3A is a graphical plot of an AC waveform across the AC power control circuit of FIGS. 1–2, when the unit is in an OFF state.
Figure 3B:
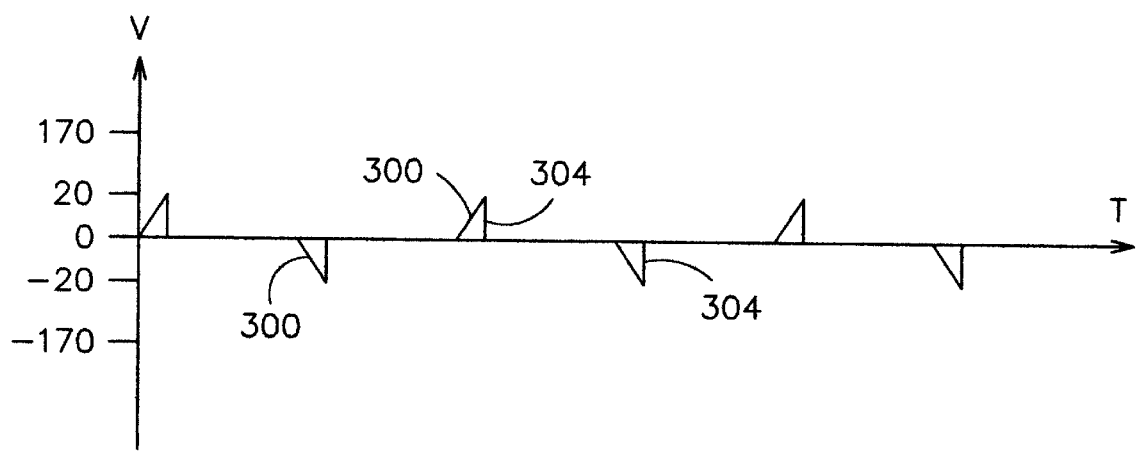
FIG. 3B is a graphical plot of an AC waveform across the AC power control circuit of FIGS. 1–2, when the unit is in an ON state.

FIGS. 3A and 3B illustrate the AC waveforms appearing across lines 16a and 16b of FIG. 2 during an ON and OFF actuation. In the OFF situation, the thyristor is not provided with any gate current pulses and the voltage across lines 16a and 16b is the same as the applied waveform. During this time, there is sufficient current supply for the internal circuitry whenever the voltage is above that indicated at 294. The internal voltage on lines 24 and 26 is clamped by diode D6 in FIG. 2 to provide an acceptable source of DC power for control circuitry 30.

In a fully ON situation, the thyristor is enabled when the instantaneous voltage indicated at 300 across the thyristor 36 provides enough power indicated at 304 to the internal circuitry both for the microcontroller and for enabling the driver 40 to provide the gate current pulse. FIG. 3B shows the voltage across lines 16a and 16b when the thyristor is in an ON state. At the beginning of each AC half cycle, a small portion of the AC power is "stolen" and used by the internal circuitry, hence the term "cycle-stealing" as used here. When the voltage reaches a level to supply the necessary current to trigger the thyristor driver and therefore the thyristor, the thyristor is turned ON providing a low impedance path for the AC current. This low impedance condition provides power to the AC load 14 through the thyristor 36.

From FIG. 1, the invention utilizes the AC power source from a wire lead 18a to control the AC load 14. The invention is connected in series with the AC power source 18a and the load 14 via first and second leads, 16a and 16b. The thyristor 36 is in series with the leads, 16a and 16b, and controls the flow of AC current to the load 14 in response to activation of the thyristor 36 by a gate current pulse. The gate current pulse is produced by the driver 34.

The driver 34 is selectively controlled by the control circuitry 30. The control circuitry 30 obtains its DC power from the power converter network 20. The power converter network 20 is coupled between first and second leads, 16a and 16b. The power converter network 20 adapts or steals a portion of the AC current at the beginning of each half cycle of the AC current and converts the AC current into a source of DC current for the control circuitry 30.

c. Power Network

Figure 4:
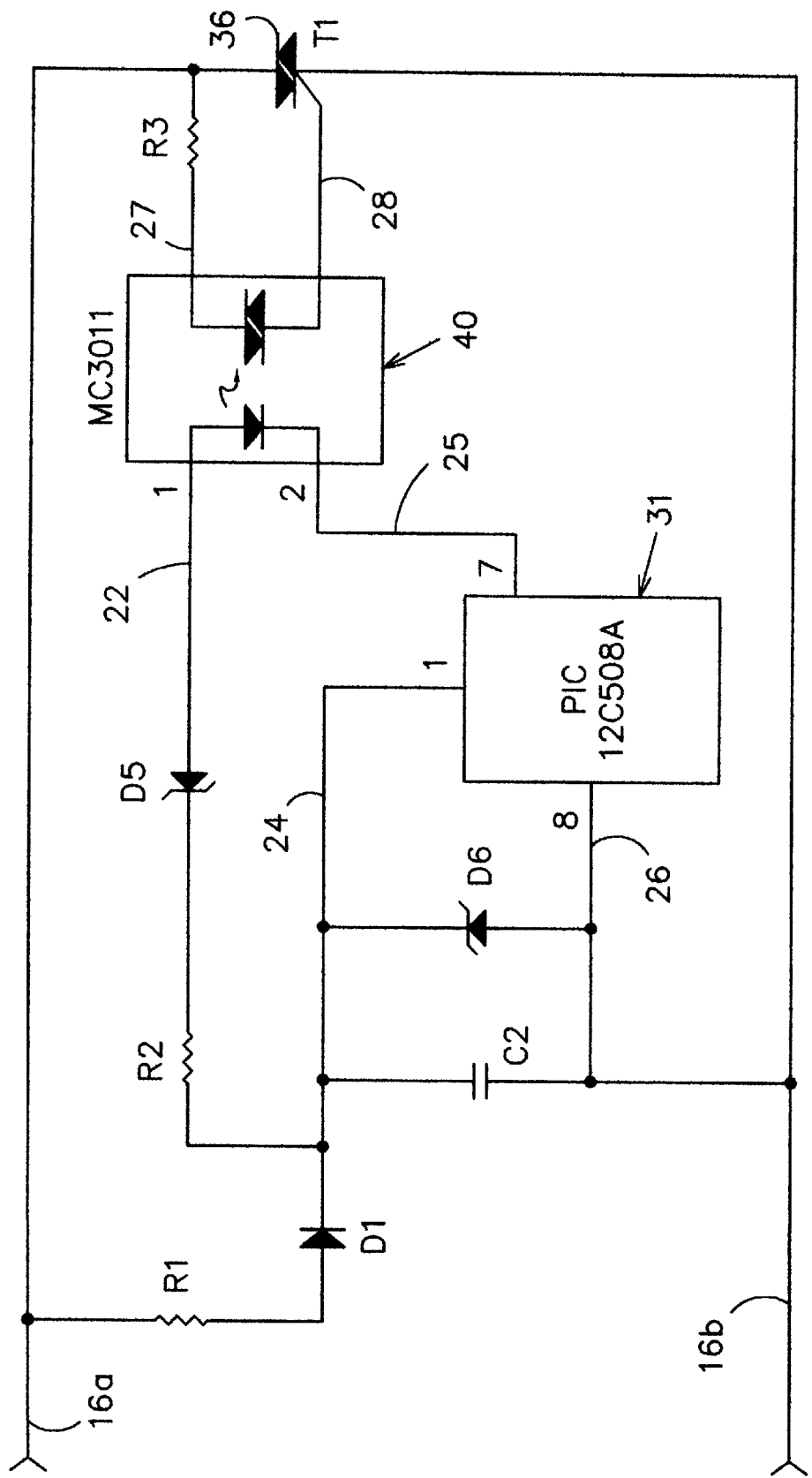
FIG. 4 is a schematic diagram showing an AC power control circuit in accordance with an embodiment of the present invention that derives DC power using half-wave rectification and a resistor.

Some examples of different power networks that will supply DC power to the cycle-stealing device include the following:

FIG. 4 shows a second embodiment, where the power conversion network includes resistor R1 and diode D1 instead of R1, C1, and diodes D1–D4. Here, the resistor R1 has a larger power rating to handle the current flow needed for the microcontroller 31 and thyristor driver 40. In order to minimize the current, this circuit uses a thyristor driver 40 with a more sensitive internal LED such as the Motorola MC3012. Diode D1 only provides power on every positive-going AC cycle.

Figure 5:
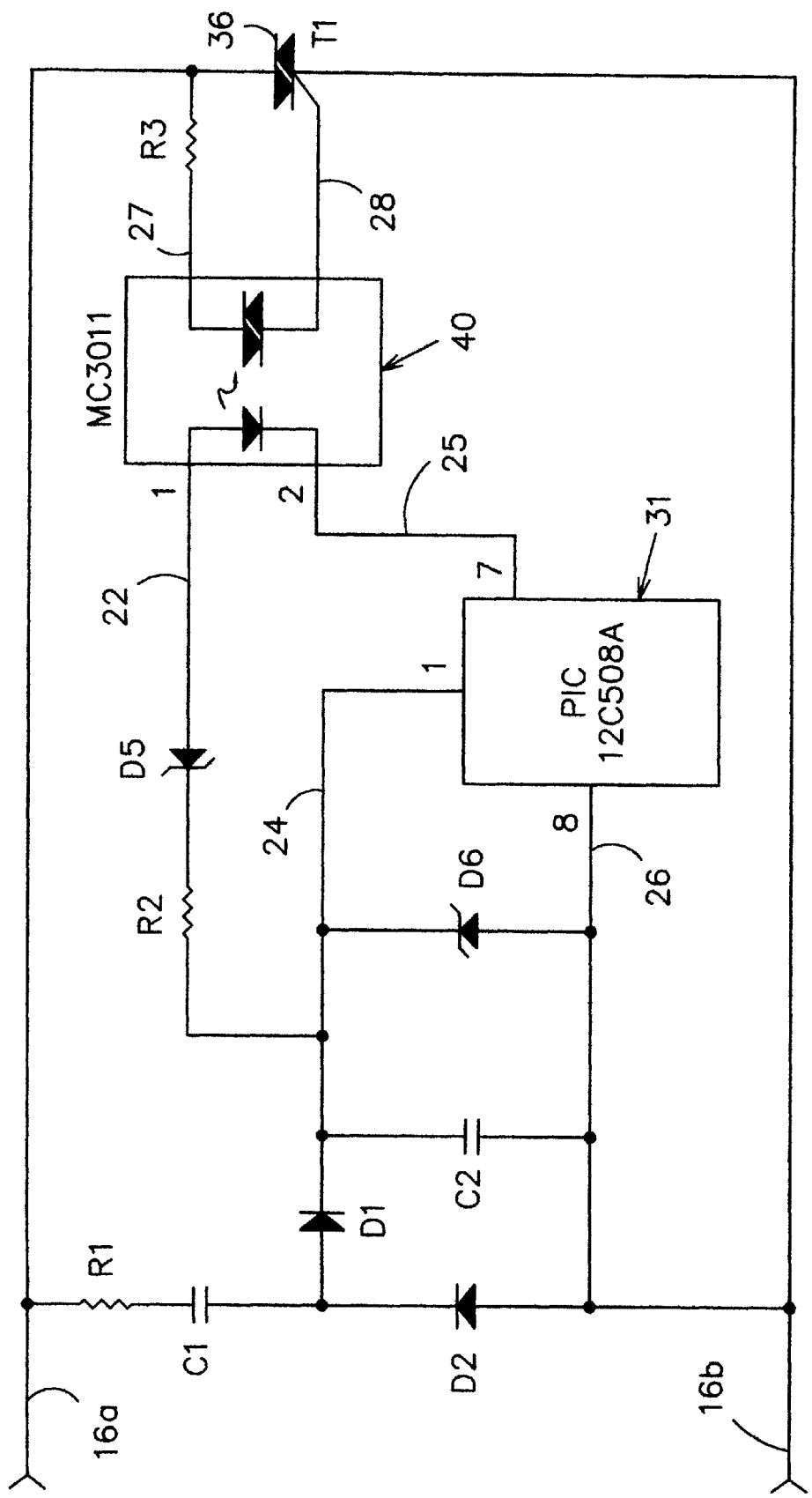
FIG. 5 is a schematic diagram showing an AC power control circuit in accordance with an embodiment of the present invention that derives DC power using half-wave rectification and a capacitor.

FIG. 5 shows third embodiment where the electrical circuit uses a capacitor C1 and a smaller value for R1 to provide the needed power. Diode D2 is needed for allowing the AC voltage to charge and discharge capacitor C1. The DC power is derived from the AC power only on positive going AC cycles.

d. Thyristor Driver

Figure 6:
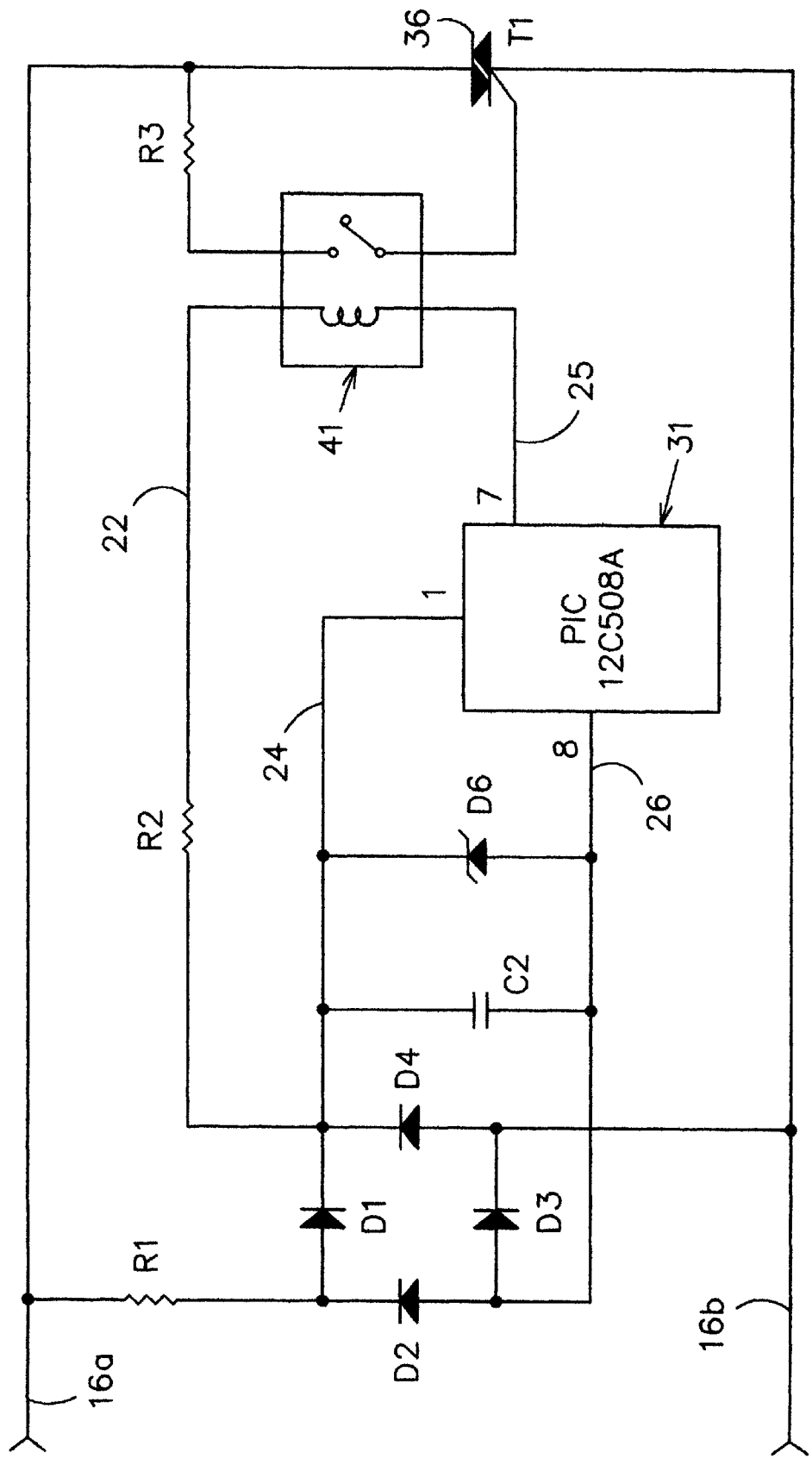
FIG. 6 is a schematic diagram showing an AC power control circuit in accordance with an embodiment of the present invention that uses a relay for the thyristor driver.

FIG. 6 illustrates another embodiment of the device using a relay 41 such as 12 VDC reed relay, Radio-Shack No. 275-233, instead of an optoisolator driver 40 in the circuitry. D5 is not needed because R2 and the resistance of the relay coil is large enough to minimize loading of the power network.

Figure 7:
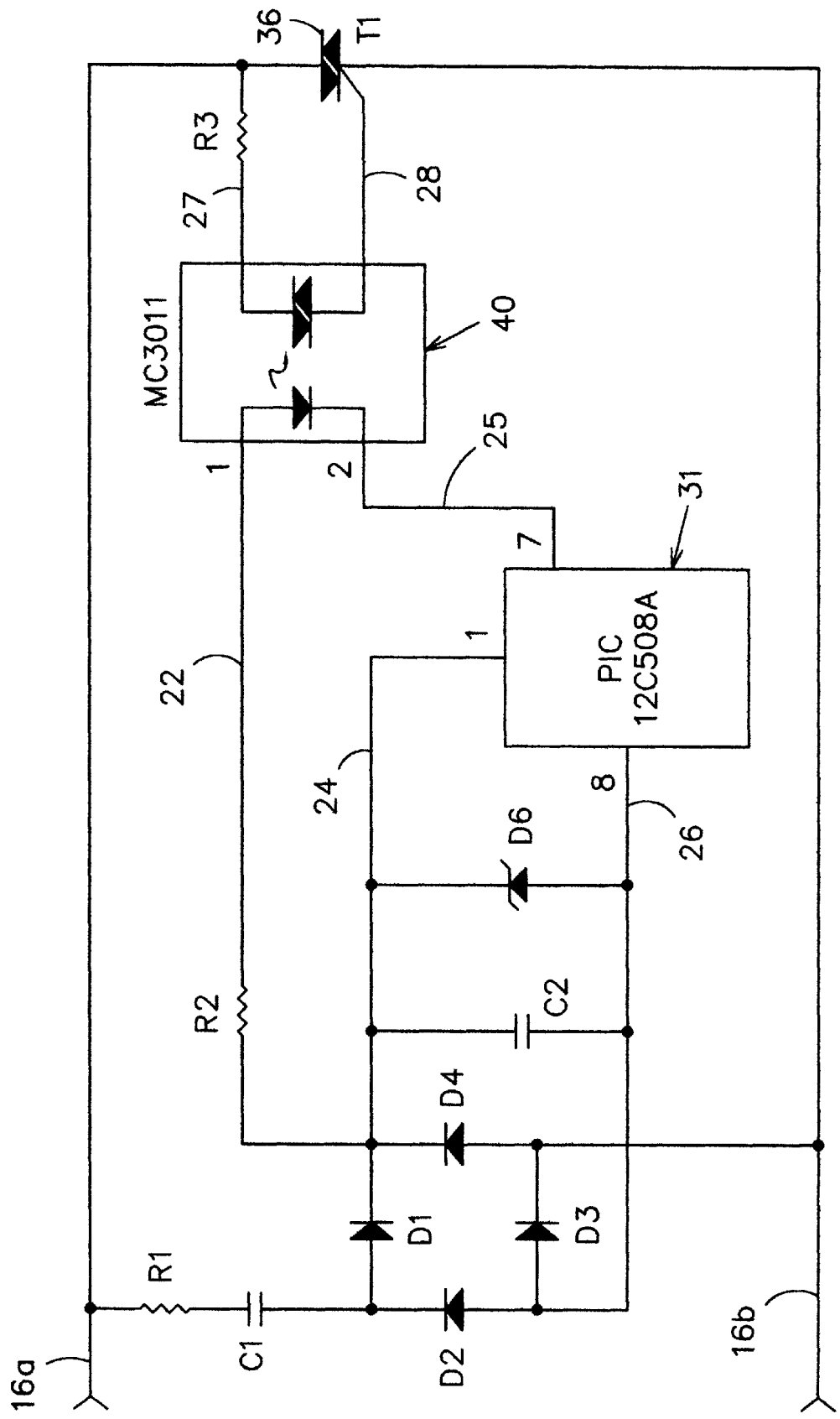
FIG. 7 is a schematic diagram showing an AC power control circuit in accordance with an embodiment of the present invention that uses an optoisolator for the thyristor driver and larger value for resistor R2.

FIG. 7 illustrates another embodiment of the device using an optoisolator driver 40 with only a higher value resistor R2. With this circuitry, the AC voltage across leads 16a and 16b will be much higher to produce the necessary drive current for the optoisolator driver 40. To minimize the drive current, a more sensitive optoisolator driver such as Motorola MC3012 would be used.

Figure 8:
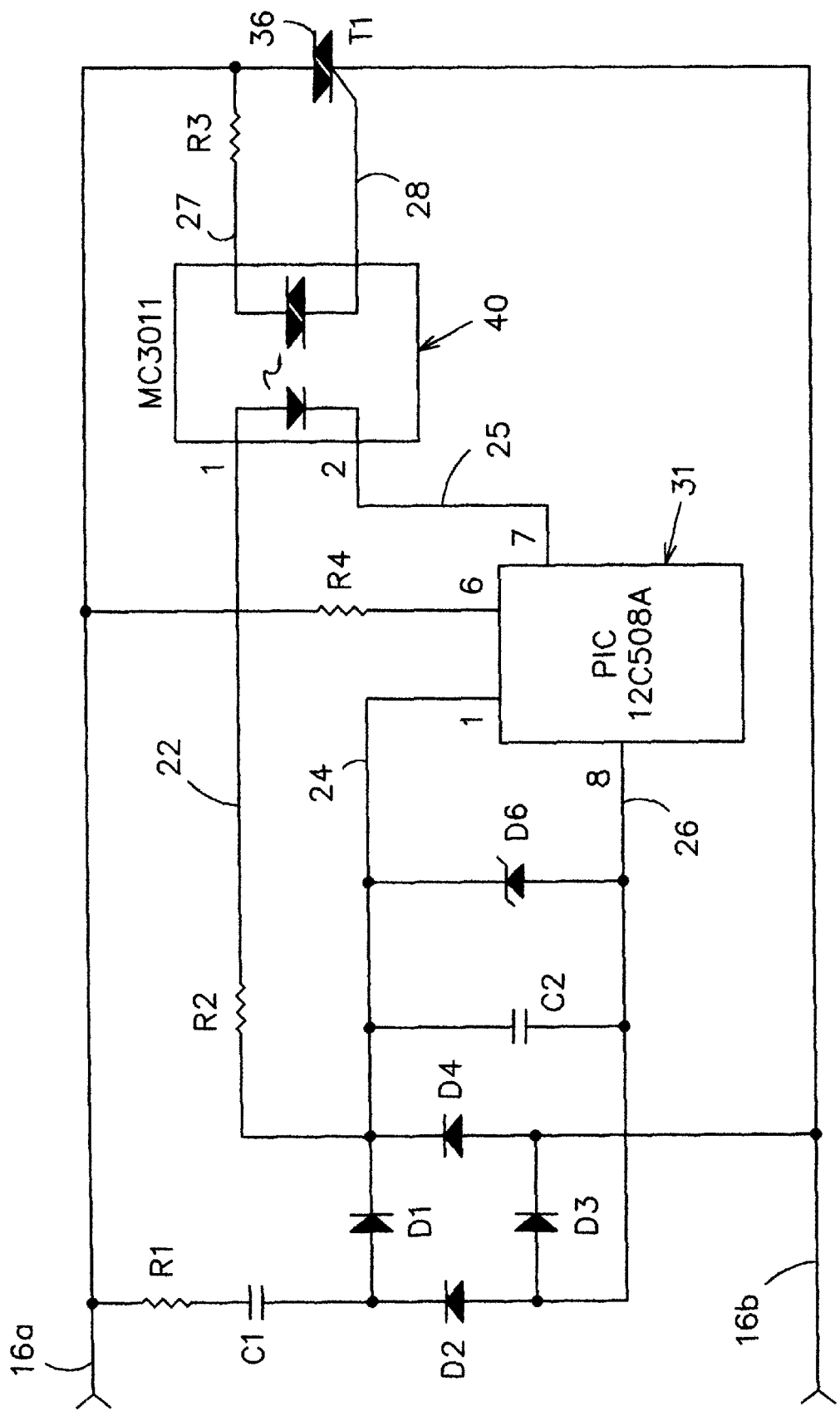
FIG. 8 is a schematic diagram showing an AC power control circuit in accordance with an embodiment of the present invention that uses a zero crossing detector to determine when to when to trigger the thyristor driver.

FIG. 8 illustrates another embodiment of the device using the a smaller value resistor R2 but includes another resistor R4 to detect the zero crossing of the AC voltage. The microcontroller 31 is programmed to pulse line 25 long enough to provide sufficient gate current pulse to trigger the triac T1. With this circuitry, the AC voltage across leads 16a and 16b will significant smaller than in circuit of FIG. 8. With smaller AC voltage waveform, a lower EMI (ElectroMagnetic Interference) can be achieved.

e. Control Circuitry

Figure 9:
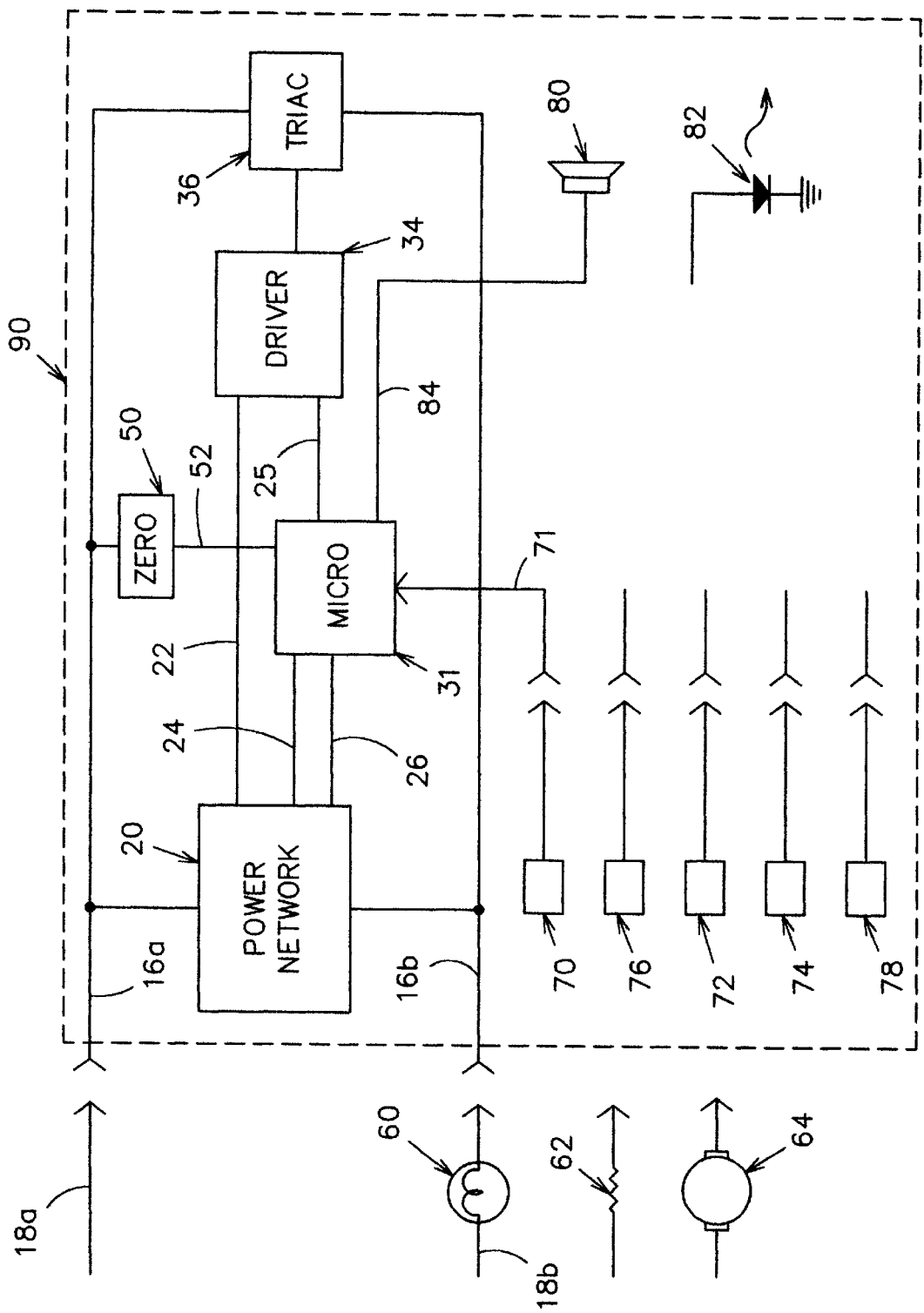
FIG. 9 is a block diagram showing an AC power control circuit in accordance with an embodiment of the present invention which incorporates a microcontroller having the capability of receiving inputs from different sensors and driving different AC loads.

FIG. 9 shows different embodiments of the control circuitry 30 of FIG. 1. FIG. 9 shows the microcontroller 31 with various inputs from different sensors such as a motion sensor 70, temperature sensor 76, smoke detector sensor 72, burglar switch 74, mode selection switches 78, and a zero crossing detector 50. Also, FIG. 9 shows the microcontroller 31 driving a speaker 80 or LED 82 from its outputs in addition to driving the thyristor driver 34. The AC power controller 40 can drive lights 60, resistive loads 62, and motors 64. The microcontroller can be programmed to turn on the light when it detects motion in the room or turn on the heater motor when the temperature is low.

Figure 10:
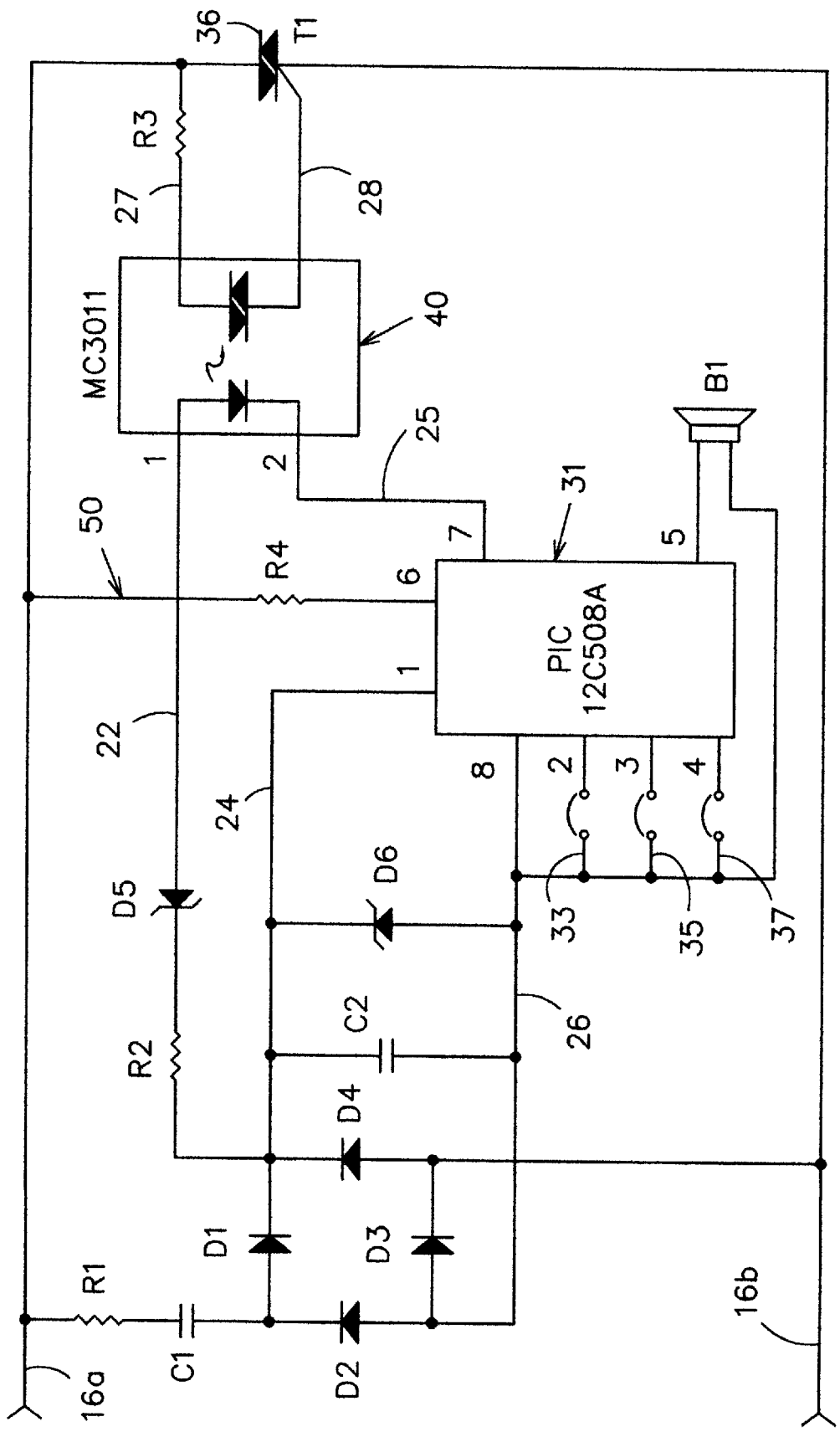
FIG. 10 is a schematic showing the AC power control circuit of FIG. 9 with zerocrossing detector and mode selection functions.

FIG. 10 shows an electrical circuit similar to FIG. 2 but with zero-crossing detector circuitry, a speaker B1 and mode selection 33, 35, and 37. The zero-crossing detector circuitry uses resistor R4 to limit the current into the microcontroller 31. The microcontroller 31 contains internal diodes, which limits the AC voltage to microcontroller supply voltage line 24 and supply return line 26. Since the zero crossings are detected, the microcontroller only needs to turn on the driver for a short time to enable the gate current pulse. This allows for the elimination of diode D5.

Figure 11A:
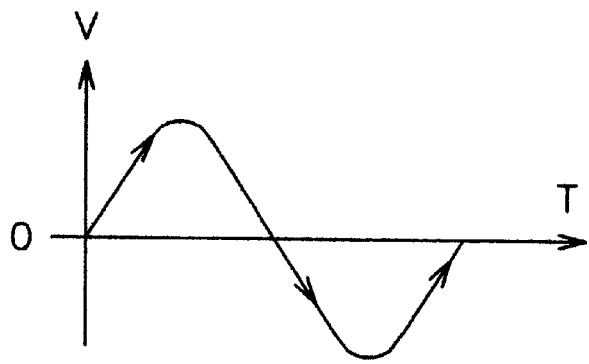
FIG. 11A is a graphical plot of an AC voltage waveform across the AC power control circuit of FIG. 10 when the device is OFF state.
Figure 11B:
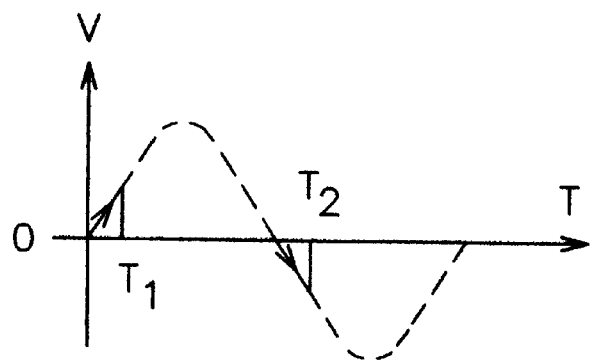
FIG. 11B is a graphical plot of an AC voltage waveform across the AC power control circuit of FIG. 10 when the device is ON state.
Figure 11C:
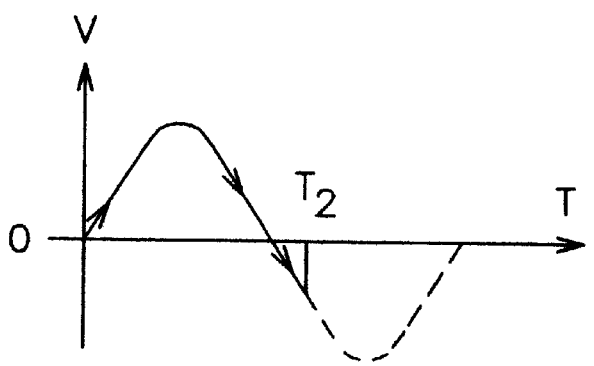
FIG. 11C is a graphical plot of an AC voltage waveform across the AC power control circuit of FIG. 10 when the device is ON state for only half of the AC cycle.
Figure 11D:
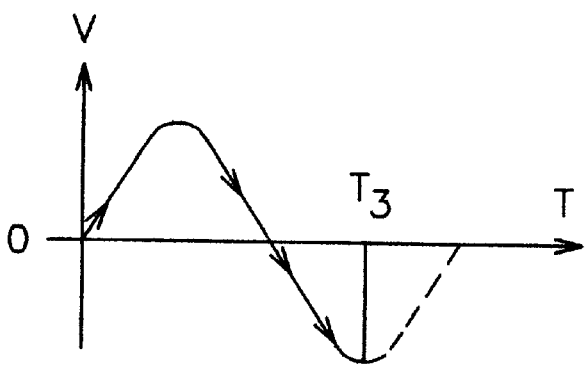
FIG. 11D is a graphical plot of an AC voltage waveform across the AC power control circuit of FIG. 10 when the device is ON state for only a quarter of the AC cycle.

FIGS. 11A, 11B, 11C, and 11D is a graphical plot of variable AC voltage triggered at different points on the AC cycle. The device is triggered by providing the gate current pulse after detecting the zero crossing. FIG. 11A shows when the zero crossing detected at time t(0). FIG. 11B illustrates the voltage across the thyristor when the AC load is powered at time t(1) and t(2) after stealing a portion to power the microcontroller 31 and providing the gate current pulse. In FIG. 11B, the AC load, such as a light, would be ON. FIG. 11C illustrates that the load is not powered until time t(2) and only a half cycle of power is applied to the load. If the AC load were a light, the light would dim to about half brightness. FIG. 11D shows that the load is not powered until time t(3) and only a portion of the half cycle is applied to the load. In FIG. 11D, the AC load would only received portion of the AC power. The microcontroller can be programmed to provide power to the load at any time for any duration.

f. Microcontroller Program

Figure 12:
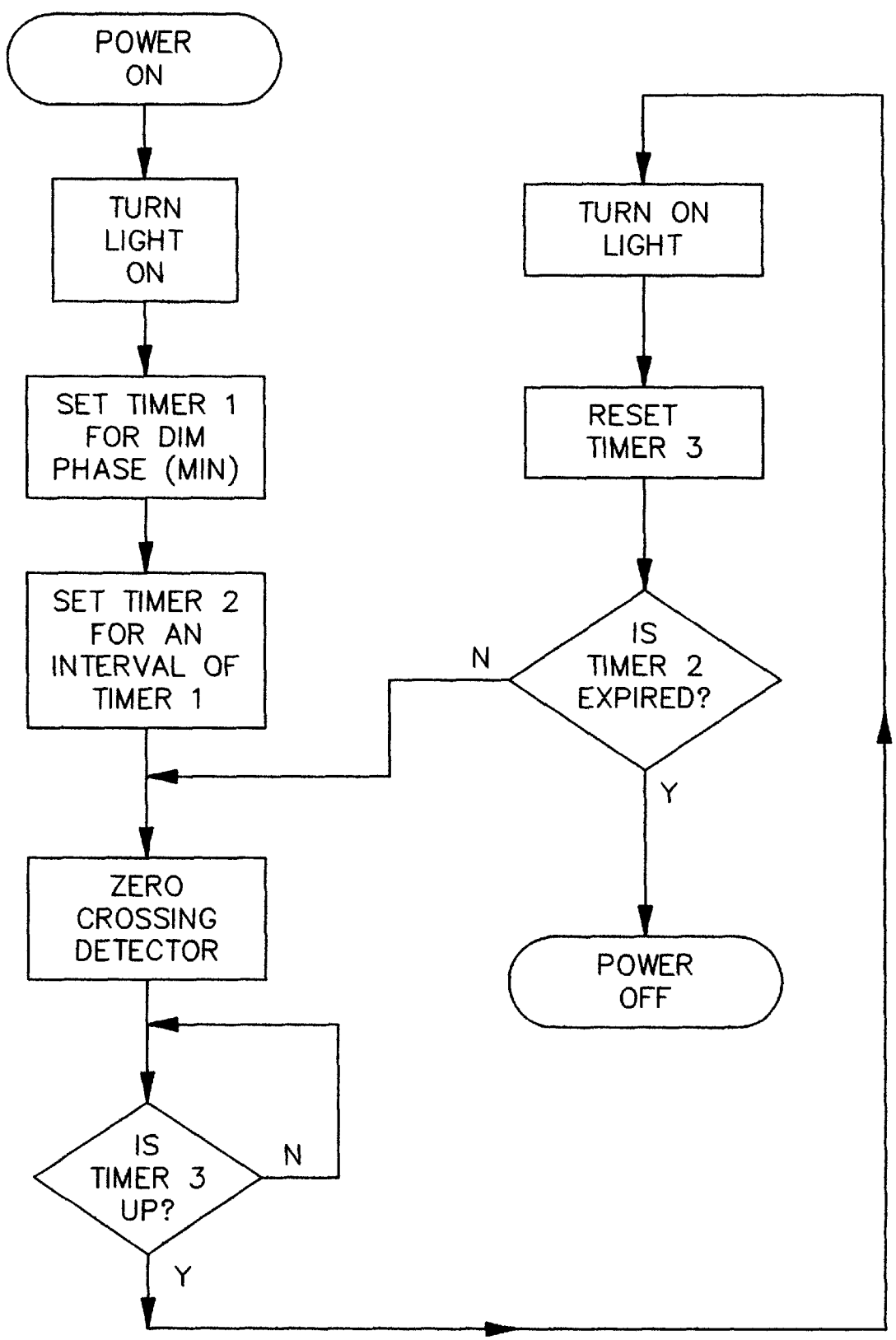
FIG. 12 is a graphical flowchart of the program of the device in FIG. 10 for continuous dimming an AC fight from ON to OFF over a period of time.

FIG. 12 shows the flowchart for the program implemented in the microcontroller 31. FIG. 10 is the electrical circuitry and FIG. 11 illustrates the waveform of the operation. With the program illustrated in FIG. 12, a continuous dimming capability from 100% to OFF condition over any time period is achieved.

The flowchart in FIG. 12 shows three timers. The first timer sets the time period when the light is fully ON to when the light is fully OFF such as thirty minutes. The second timer sets the time period for how long the light will be in each dimming position, such as eight seconds, for example. The third timer sets the time period from the zero crossing until the light is turned ON such as two milliseconds for one dimming setting. This example of two milliseconds can be represented of the third timer at time t(1) of the cycle. When the third timer is at t(3) of the cycle, the AC load would only be ON for about 25% of the time This third timer is varied over the first timer's period from turning the light ON to full brightness to turning the light ON at the end of the full cycle is completed which is 1/60 second for a 60 Hz AC power source. Each dimming setting will be ON for the duration of second timer.

Figure 13:
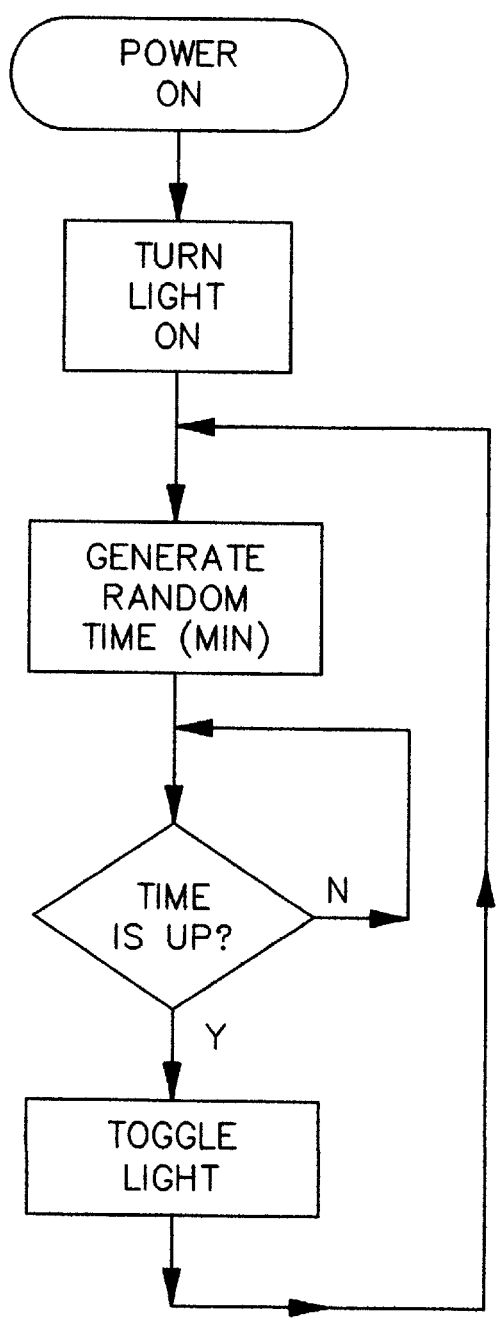
FIG. 13 is a graphical flowchart of the program of the device in FIG. 10 for randomly turning an AC load ON and OFF over a period of minutes and hours.
Figure 14:
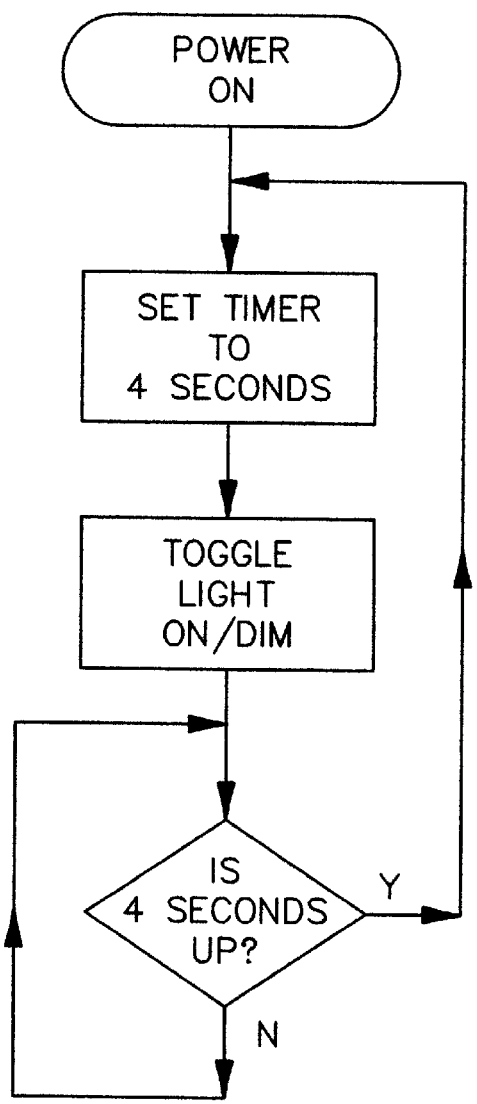
FIG. 14 is a graphical flowchart of the program of the device in FIG. 10 for flashing an AC light between ON and DIM.
Figure 15:
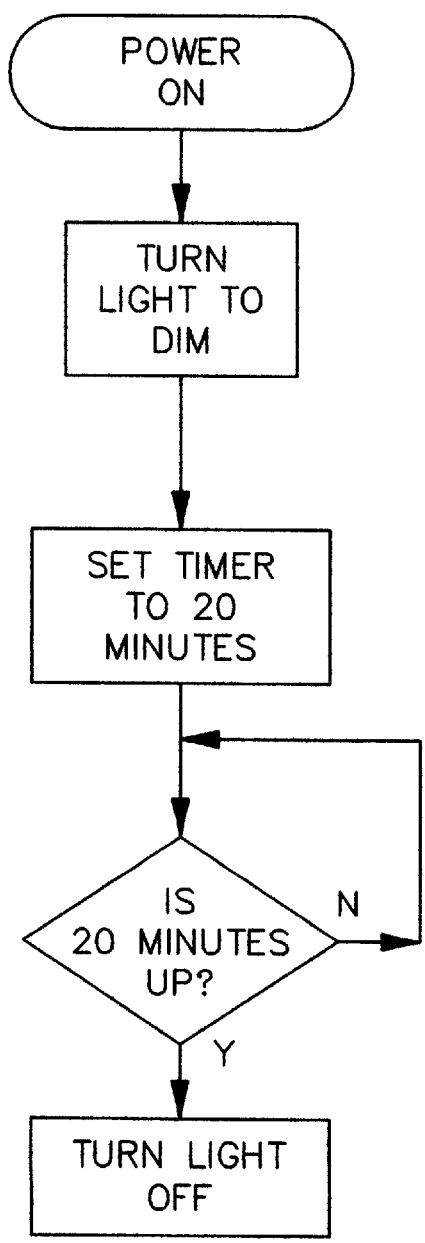
FIG. 15 is a graphical flowchart of the program of the device in FIG. 10 for dimming the lights for period of time and then turning the lights to and OFF state.
Figure 16:
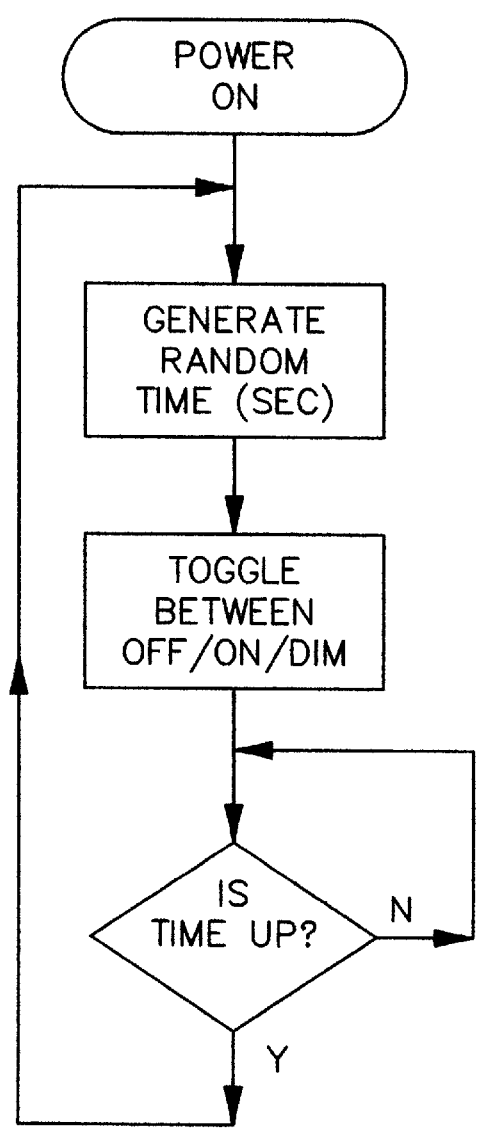
FIG. 16 is a graphical flowchart of the program of the device in FIG. 10 for randomly turning the light to an ON state, an OFF state, and a DIM state at a high flash rate.
Figure 17:
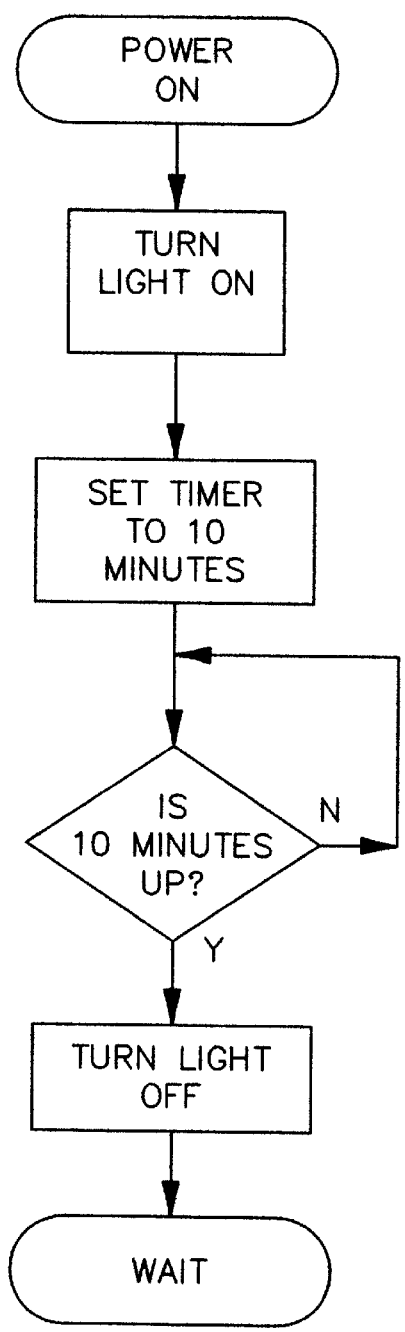
FIG. 17 is a graphical flowchart of the program of the device in FIG. 10 for turning the lights to an OFF state after a period of time.
Figure 18:
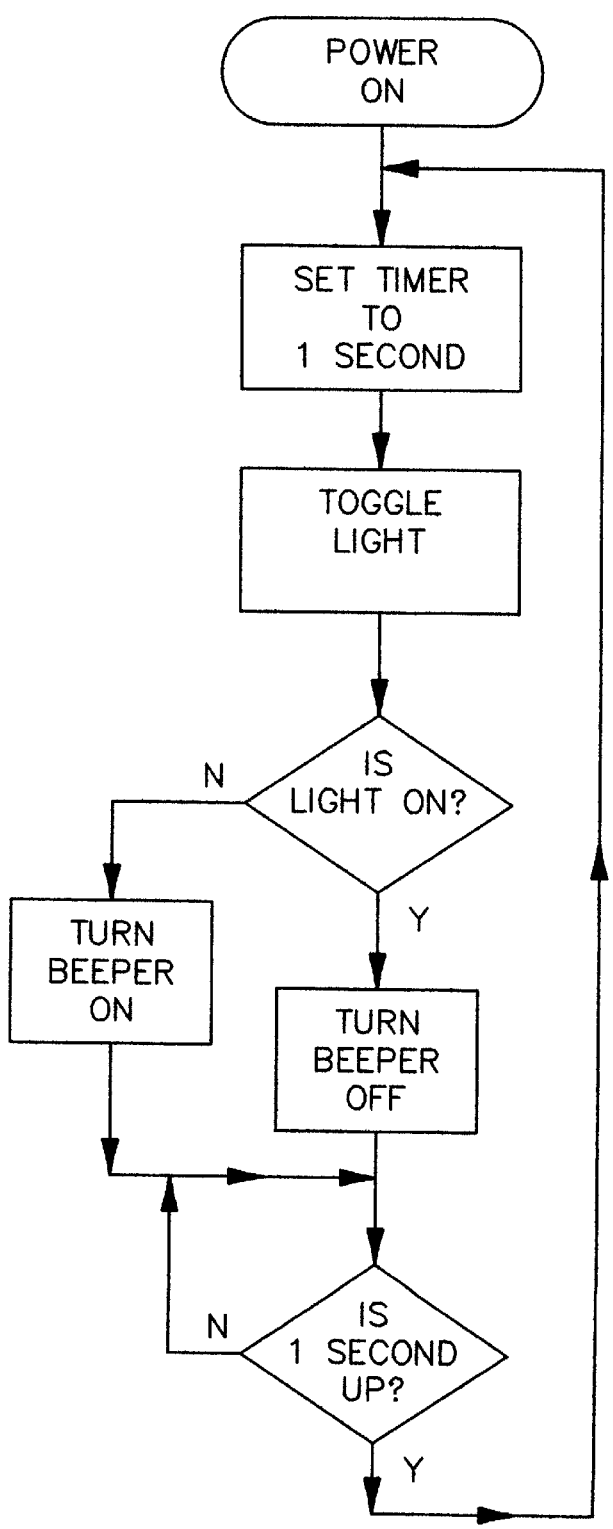
FIG. 18 is a graphical flowchart of the program of the device in FIG. 10 for flashing the light to ON and OFF states, and sounding a beeper.
Figure 19:
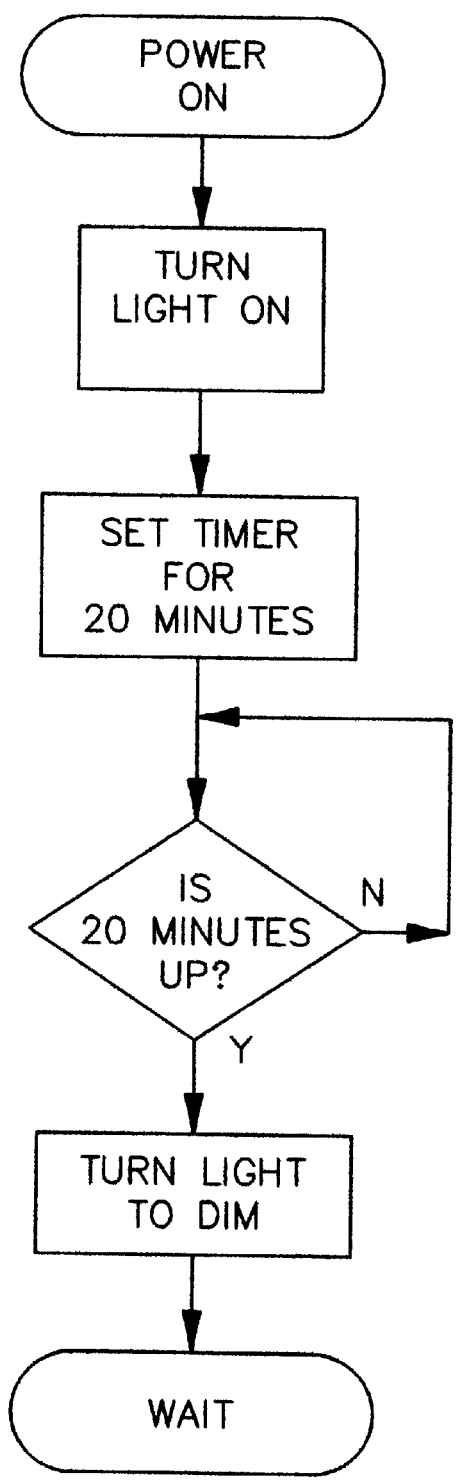
FIG. 19 is a graphical flowchart of the program of the device in FIG. 10 for turning the light to an ON state for a period of time and then to a DIM state thereafter.
Figure 20:
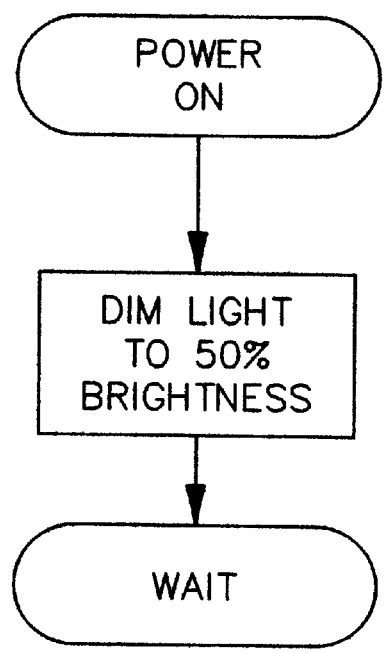
FIG. 20 is a graphical flowchart of the program of the device in FIG. 10 for dimming the light.

Also, the microcontroller 31 is programmable for several other functions. FIG. 13 shows the flowchart of a program which turns the light 60 ON and OFF randomly between time periods in minutes or hours. This simulates that the house is occupied and deters burglars from breaking into the home. FIG. 14 illustrates the program for flashing the light 60 between ON at full brightness and dim at a visually discernable rate, such as four seconds. If installed in the circuit for the porch light, this would bring attention to the house so that the pizza or other delivery services could easily locate the house. FIG. 15 illustrates the program for turning the lights to dim for a period of time such as twenty minutes and then OFF. This feature would allow parents to keep the light ON low for their children until they fell asleep and then automatically turn OFF. FIG. 16 illustrates a program to randomly turn the light 60 ON, OFF, and DIM at a high rate in seconds. This flickering effect would provide a party-type atmosphere. FIG. 17 illustrates a program to turn the lights OFF after a pre-set period of time such as ten minutes. FIG. 18 illustrates a program to turn the lights ON and OFF at a relatively high rate, such as a second, and which sounds a beeper B1 while it is in an OFF cycle. If used on the front porch light would allow emergency response personnel to locate the home more quickly and alert the occupants that the device is functioning by the sound. FIG. 19 illustrates the program for turning the light 60 on for a period of time such as twenty minutes and than dim thereafter. This would be used on lights to save energy, but not eliminate the lighting. FIG. 20 illustrates the program where light 60 is turned ON every half cycle thereby providing a dimming function.

g. Mounting Schemes

Figure 21:
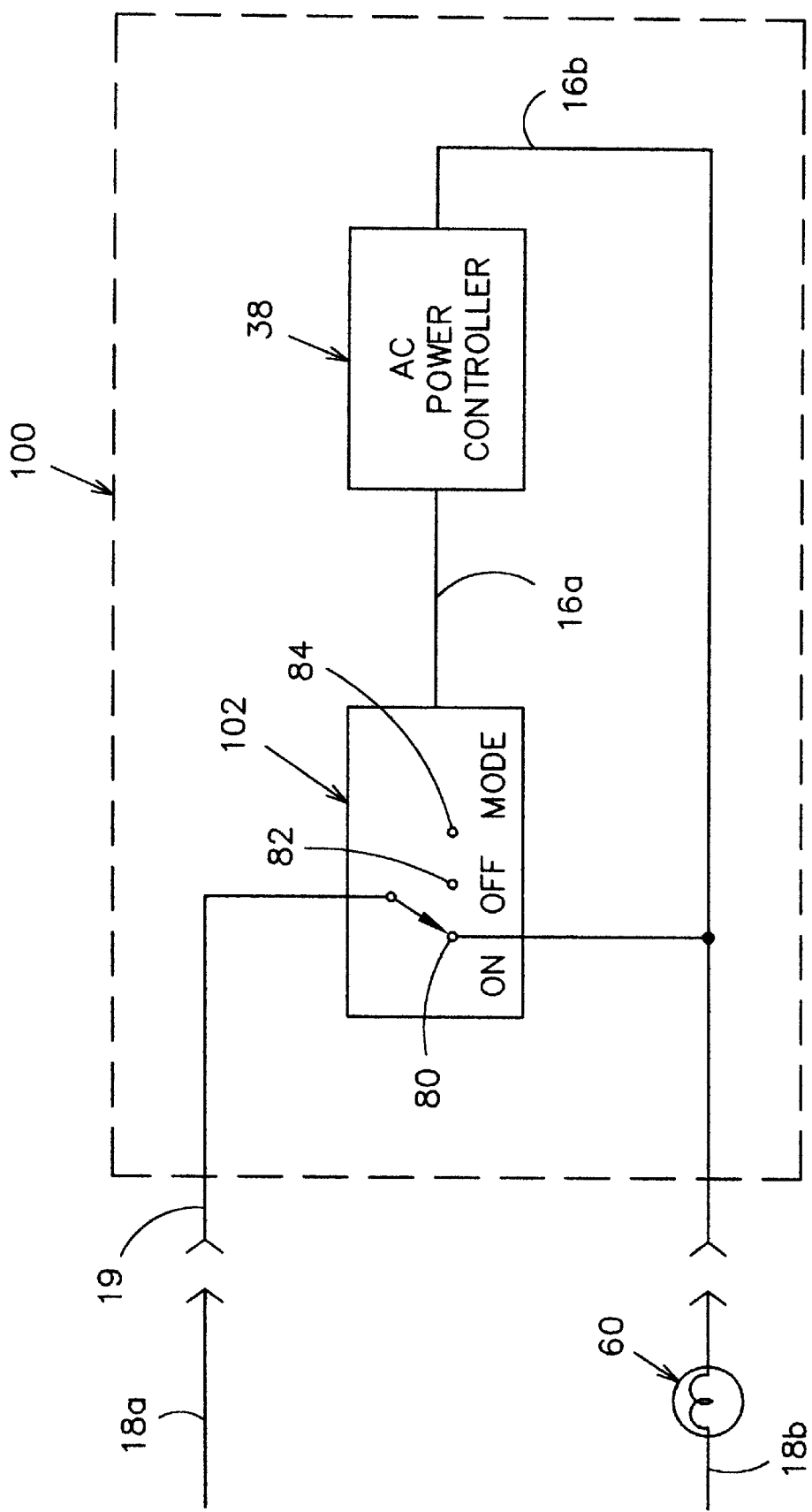
FIG. 21 is a block diagram showing a three-position switch combined with the AC power control circuit of FIGS. 1–2.
Figure 22:
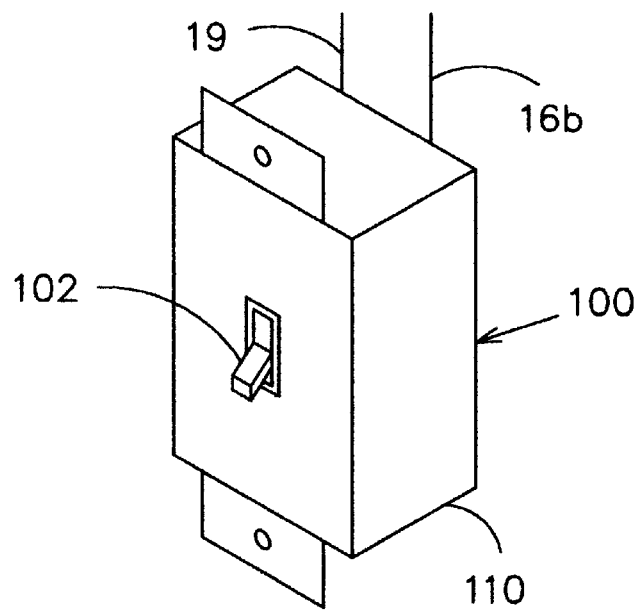
FIG. 22 is a perspective view showing an electrical switch box with the three-position switch and AC power control circuit of FIG. 21 housed therein.
Figure 23:
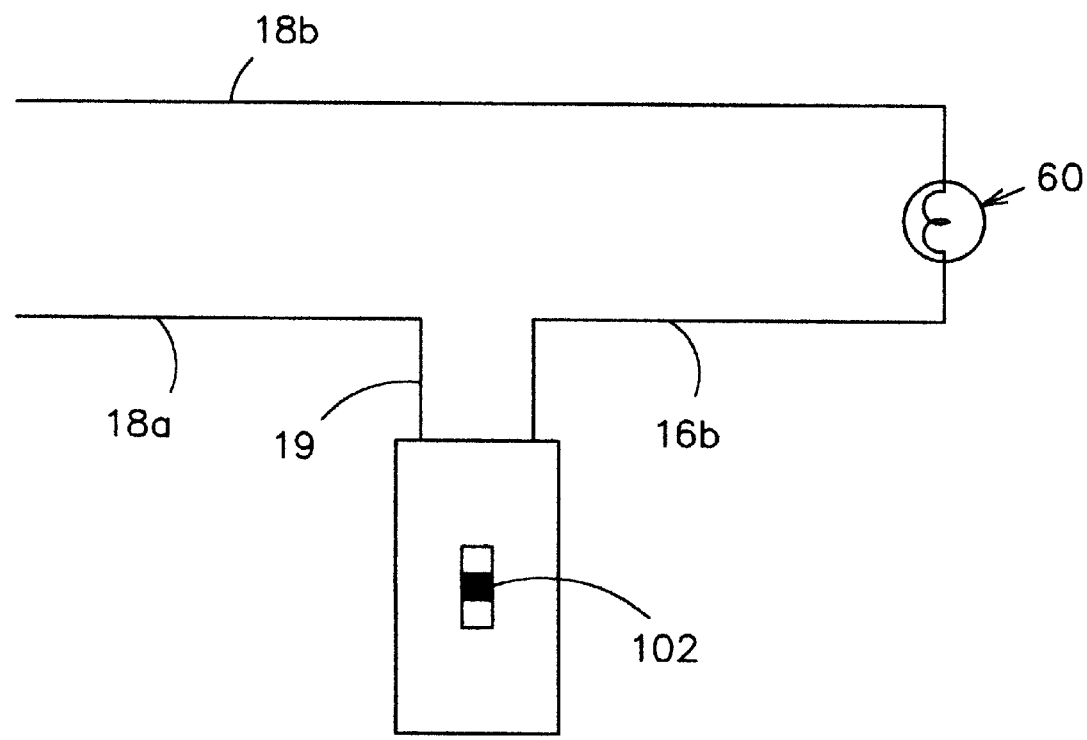
FIG. 23 is a perspective view showing an AC electrical system with the AC power control switch of FIG. 22 in series with the light.
Figure 24:
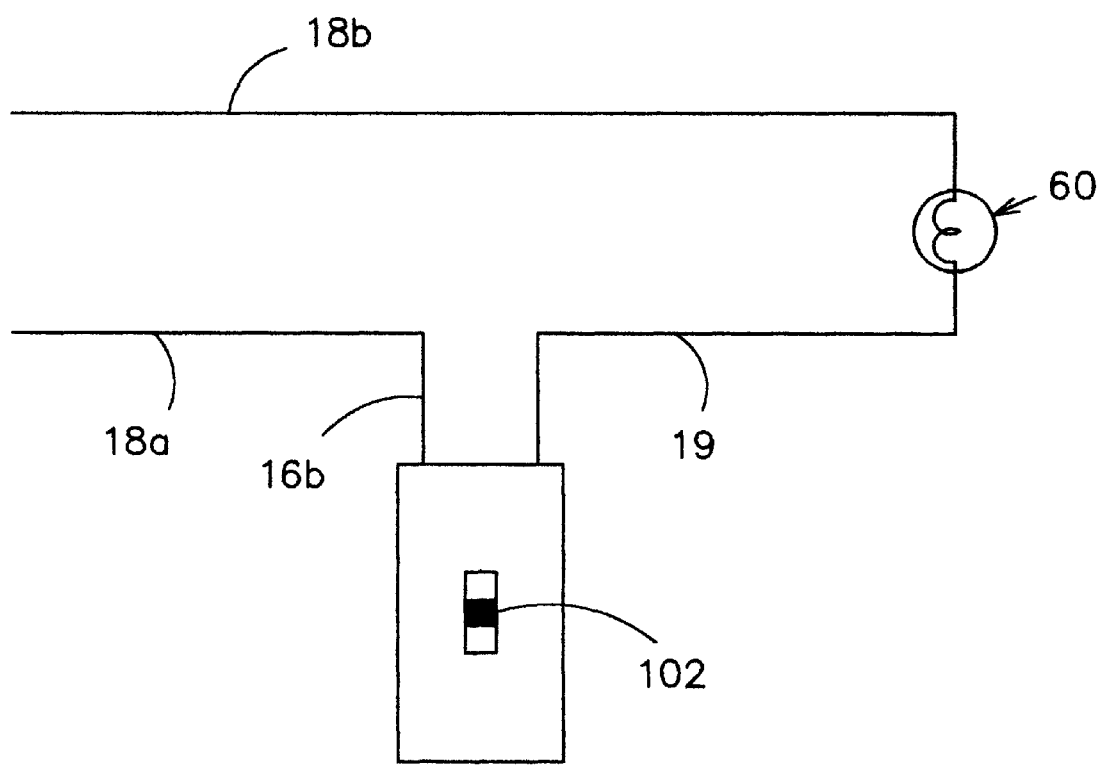
FIG. 24 is a perspective view showing an AC electrical system with AC power control switch of FIG. 22 with reverse connection to the AC power and AC load.

Mounting the AC power controller 38 with a three-position switch 102 provides three levels of operation as shown in FIG. 21. The apparatus 100 is connected in series with the light 60 and AC power lines 18a and 18b. The three levels of operation are the ON position 80, the OFF position 82, and the MODE position 84. In the MODE position 84, the AC power controller 38 operates the light in accordance with its programmed operation. FIG. 22 shows the three-position switch and the AC power controller 38 in an electrical box 110. Lines 19 and 16b connect to the light 60 and the AC power. FIG. 23 and FIG. 24 show the connections to the electrical circuit. Either line 19 or 16b can be connected to the AC load or AC power.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description.

What is claimed and desired to be secured by Letters Patent of the United States is:

1. A method for switching AC power flow through and deriving a supply of DC power from one side of an AC power circuit, comprising the steps of:
   a) providing a gate-enabled thyristor for controlling switching of AC power flow through the circuit, said thyristor having ON and OFF states;
   b) deriving a source of constant DC voltage from said AC power flow from a small portion of every AC half cycle or full cycle which appears across said thyristor in each of said ON state thereof; and
   c) alternately, (i) enabling said thyristor into an ON state by providing a gate current pulse at a specified time dictated by a control unit at any time in said AC half or full cycle and after the deriving said DC voltage, and (ii) maintaining said thyristor in said OFF state by not providing gate current pulse thereto.

2. An electrical current control apparatus for operatively interconnecting one side of a source of AC current with an AC load, comprising:
   a) a thyristor having first and second leads coupled between said source and said AC load, said thyristor having, ON and OFF states and being connected in said first lead so as to permit flow of AC current through said first lead in response to activation of said thyristor by a gate current pulse, said thyristor further being configured to remain actuated after termination of said gate current pulse so long as a predetermined minimum current is flowing through said first lead;
   b) power conversion means coupled between said first and second leads and effective for converting a small portion of AC current at the beginning of each half cycle which appears across the thyristor in each of said ON states thereof into a source of constant DC voltage power supply;
   c) control means powered by said DC voltage for selectively providing an actuation output at a specified time dictated by the control means at any time after deriving the said DC voltage power supply from each half cycle of said AC current; and
   d) a driver for selectively initiating or not initiating said gate current pulse to said thyristor in response to said actuation output from said control means said driver being connected to said first lead in parallel with said thyristor, so that said pulse if initiated is terminated by actuation of said thyristor and the remainder of said half cycle of said AC current flows through said thyristor and said thyristor remains actuated until said AC current drops below said predetermined minimum current.

3. The control apparatus of claim 2, wherein said control means comprises a programmable microcontroller.

4. The control apparatus of claim 2, wherein said power conversion means comprises means for diverting a small portion of said AC current at the beginning of every half cycle of said AC current and adapting said portion of said AC current to said constant DC voltage power supply.

5. An apparatus for selectively energizing an AC electrical load from one side of an AC power circuit, comprising:
   a) a thyristor having ON and OFF states, said thyristor being coupled between first and second AC current leads for controlling a flow of AC line current from said thyristor to said AC electrical load;
   b) a microcontroller which is programmed to selectively provide or not provide enabling gate current pulses to said thyristor; and
   c) a constant DC voltage power supply coupled with said thyristor and effective to derive electrical power for said microcontroller from a small portion of every half cycle or full cycle of said AC current which appears across said thyristor in each said ON state thereof.

6. An apparatus for energizing an AC electrical load from one side of an AC power circuit, comprising:
   a) a thyristor having ON and OFF states, said thyristor being coupled between first and second AC current leads for controlling a flow of AC line current from said thyristor to said AC electrical load;
   b) a zero crossing detector for detecting zero crossings of a sinusoidal waveform of said AC line current;
   c) a microcontroller which is programmed to selectively provide or not provide a gate current pulse to said thyristor in response to said detector detecting a zero crossing; and
   d) means for deriving constant DC voltage power supply from a small portion of every half AC cycle or full AC cycle which appears across said thyristor in each of said ON state thereof, and for supplying said constant DC voltage power to said microcontroller.

7. An apparatus for selectively energizing a high-voltage AC electrical load, comprising:
   a) a switch housing mountable within the interior of dwelling connected to one side of AC power supply and to one side of the said AC electrical load;
   b) a switch mounted to said housing having an "off" position, an "on" position, and a "mode" position;
   c) means responsive to selection of said "off" position for interrupting flow of AC current to said load;
   d) means responsive to selection of said "on" position for completing said circuit as to provide continuous flow of current to said load;
   e) a microcontroller mounted in said switch housing;
   f) means responsive to selection of said "mode" position for completing and interrupting said circuit so as to permit flow of current through a thyristor having ON and OFF states connected in said leads so that said AC electrical load is energized and de-energized in accordance with a predetermined sequence which is programmed into said microcontroller; and
   g) means for deriving a source of constant DC voltage power from a small portion of every half AC cycle or full AC cycle, which appears across said thyristor in each of said ON state thereof and for supplying said constant DC voltage power to said microcontroller.

8. The apparatus of claim 7, wherein said microcontroller is programmed to turn said AC load ON and OFF at long, random-time intervals.

9. The apparatus of claim 7, wherein said microcontroller is programmed to turn said AC load ON and to a state that is less than full ON at a periodic rate.

10. The apparatus of claim 7, wherein said microcontroller is programmed to turn said AC load ON for predetermined interval of time and then OFF thereafter.

* * * * *

(12) EX PARTE REEXAMINATION CERTIFICATE (8964th)

United States Patent
Bishel

(10) Number: US 6,356,038 C1
(45) Certificate Issued: *Apr. 17, 2012

(54) MICROCOMPUTER-CONTROLLED AC POWER SWITCH CONTROLLER AND DC POWER SUPPLY METHOD AND APPARATUS

(76) Inventor: Richard A. Bishel, Beaverton, OR (US)

Reexamination Request:
No. 90/009,927, Jul. 22, 2011

Reexamination Certificate for:
Patent No.: 6,356,038
Issued: Mar. 12, 2002
Appl. No.: 09/489,876
Filed: Jan. 20, 2000

(*) Notice: This patent is subject to a terminal disclaimer.

Related U.S. Application Data

(63) Continuation-in-part of application No. 09/251,233, filed on Feb. 16, 1999, now abandoned, which is a continuation of application No. 08/358,338, filed on Dec. 14, 1994, now Pat. No. 5,872,832.

(51) Int. Cl.
*G05F 1/00* (2006.01)

(52) U.S. Cl. .................. 315/291; 315/307; 315/287; 323/905

(58) Field of Classification Search ............... None
See application file for complete search history.

(56) References Cited

To view the complete listing of prior art documents cited during the proceeding for Reexamination Control Number 90/009,927, please refer to the USPTO's public Patent Application Information Retrieval (PAIR) system under the Display References tab.

*Primary Examiner* — My-Trang Nu Ton

(57) ABSTRACT

An AC controller which provides programmable switching of AC power flow, together with producing a source of DC power for operating the AC controller. The AC controller is connected in series with only one side of the AC power source and the AC load. The AC controller utilizes a thyristor for AC power control switching. During the operation, the AC controller steals a small portion of each half-cycle of the AC power to provide DC power to the AC controller. The AC controller enables the flow of AC current by providing a gate current pulse at any predetermined time during the half cycle. Once the thyristor is ON, the AC current flows through the thyristor until the AC cycle is at or near zero. To provide an OFF state, the AC controller does not provide a gate current pulse. The AC controller uses an microcontroller for the programmable capability. The AC controller can be programmed to provide a flashing light function, a time delay off mode, an automatic fade mode, a dimming function, a burglar deterrent function, and a time delay dim function. With a three-position switch which can replace existing types of wall switches, three modes of operation are achieved: ON, OFF, and MODE. The mode position initiates operation of the special function of the controller.

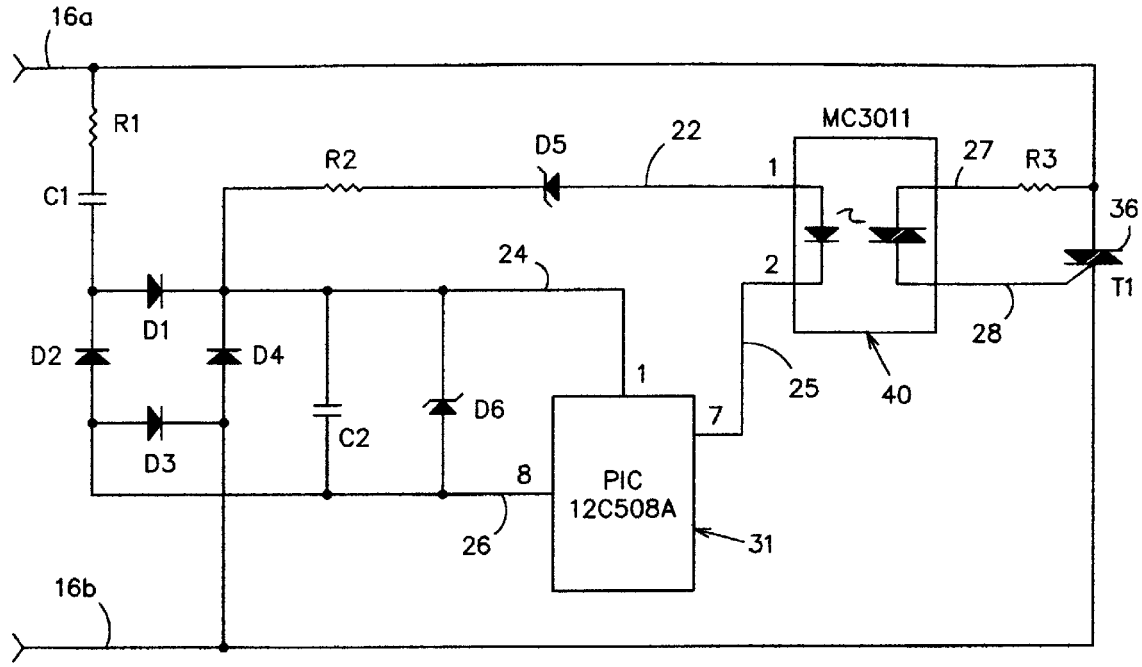

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

Claims 7-10 were not reexamined.

\* \* \* \* \*